(12) United States Patent
Hodono et al.

(10) Patent No.: US 8,055,112 B2
(45) Date of Patent: Nov. 8, 2011

(54) METHODS OF MANUFACTURING OPTICAL WAVEGUIDE FILM AND OPTICAL SUBSTRATE

(75) Inventors: Masayuki Hodono, Osaka (JP); Kunio Nagasaki, Osaka (JP); Miho Yamaguchi, Osaka (JP); Shinji Inokuchi, Osaka (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 12/923,158

(22) Filed: Sep. 7, 2010

(65) Prior Publication Data

US 2011/0005677 A1      Jan. 13, 2011

Related U.S. Application Data

(62) Division of application No. 12/222,035, filed on Jul. 31, 2008, now Pat. No. 7,822,308.

(30) Foreign Application Priority Data

Jul. 31, 2007 (JP) ................................. 2007-199995

(51) Int. Cl.
 *G02B 6/10* (2006.01)
(52) U.S. Cl. ........................................................ 385/129
(58) Field of Classification Search .................. None
 See application file for complete search history.

(56) References Cited

U.S. PATENT DOCUMENTS

| | | | |
|---|---|---|---|
| 6,091,874 A | | 7/2000 | Higashi et al. |
| 6,205,266 B1 * | | 3/2001 | Palen et al. .................. 385/15 |
| 2001/0009597 A1 * | | 7/2001 | Alibert ........................ 385/52 |
| 2003/0007754 A1 | | 1/2003 | Terashima |
| 2004/0022499 A1 | | 2/2004 | Shimizu et al. |
| 2005/0201714 A1 | | 9/2005 | Mune et al. |
| 2005/0238278 A1 | | 10/2005 | Nakashiba et al. |
| 2006/0018615 A1 | | 1/2006 | Imai |
| 2006/0098926 A1 | | 5/2006 | Shelnut et al. |
| 2006/0133766 A1 | | 6/2006 | Shelnut et al. |
| 2008/0260341 A1 | | 10/2008 | Shibita et al. |

FOREIGN PATENT DOCUMENTS

| | | |
|---|---|---|
| EP | 1338904 | 8/2003 |
| JP | 11-38241 | 2/1999 |
| JP | 2000-187131 | 7/2000 |
| JP | 2001-166165 | 6/2001 |
| JP | 2002-62458 | 2/2002 |
| JP | 2002-90586 | 3/2002 |
| JP | 2002-116334 | 4/2002 |
| JP | 2003-013015 | 1/2003 |
| JP | 2004-115766 | 4/2004 |
| JP | 2004-341454 | 12/2004 |
| JP | 2005-266769 | 9/2005 |
| JP | 2005-298674 | 10/2005 |
| JP | 2006-72352 | 3/2006 |

* cited by examiner

*Primary Examiner* — Sung Pak
(74) *Attorney, Agent, or Firm* — Jean C. Edwards, Esq.; Edwards Neils PLLC

(57) ABSTRACT

An optical waveguide film includes a clad layer having an adhesive function; and a core layer covered by the clad layer.

4 Claims, 4 Drawing Sheets

(a)

(b)

(c)

(d)

(a)

(b)

(c)

(a)

(b)

(c)

METHODS OF MANUFACTURING OPTICAL WAVEGUIDE FILM AND OPTICAL SUBSTRATE

CROSS REFERENCE TO RELATED APPLICATION

The present application is a Divisional Application of U.S. patent application Ser. No. 12/222,035, filed on Jul. 31, 2008, now U.S. Pat. No. 7,822,308, which claims priority from Japanese Patent Application. No. 2007-199995 filed on Jul. 31, 2007, the contents of all of which are herein incorporated by reference in their entirety.

BACKGROUND OF THE INVENTION

1. Field of the Invention

The present invention relates to an optical waveguide film, an optical substrate and a method for manufacturing the optical waveguide film and the optical substrate, and more particularly, to an optical waveguide film and its manufacturing method, and an optical substrate including the optical waveguide film and its manufacturing method.

2. Description of Related Art

Conventionally, optical waveguide films used to optically connect between a plurality of optical elements provided on an optical substrate are known. Such optical waveguide film needs to be precisely positioned to the optical substrate when arranged thereon in order to secure an optical path.

For example, there has been proposed an optical wiring film made of a plurality of optical wiring layers and formed on a silicon substrate via a curable adhesive layer (cf. for example, Japanese Unexamined Patent Publication No. 2002-116334). In this proposal, an alignment pattern is formed each on a surface of an optical wiring film and a surface of a supporting substrate so as to oppose each other in the thickness direction, and then the optical wiring film is aligned with the silicon substrate by these alignment patterns.

SUMMARY OF THE INVENTION

However, Japanese Unexamined Patent Publication No. 2002-116334 proposes that the curable adhesive layer is interposed between the optical wiring film and the silicon substrate, more specifically, between the alignment patterns opposing each other in the thickness direction. Therefore, the alignment patterns are difficult to be visually identified during alignment due to the interposition of the curable adhesive layer. This results in difficulty in accurately aligning the optical wiring film with the silicon substrate.

In addition, the interposition of the curable adhesive layer disadvantageously increases the thickness of the optical wiring film, thereby making it difficult to miniaturize the optical wiring film and also increasing the production cost.

An object of the present invention is to provide an optical waveguide film, an optical substrate and manufacturing methods thereof, which can ensure excellent positioning accuracy during positioning and can achieve miniaturization and reduction in production cost.

The optical waveguide film of the present invention comprises a clad layer having an adhesive function, and a core layer covered by the clad layer.

Since the clad layer has the adhesive function, the clad layer can be directly adhered to a surface of a supporting substrate when the optical waveguide film is positioned to the supporting substrate. Therefore, even though a positioning mark is formed in both the optical waveguide film and the supporting substrate, these positioning marks can be accurately viewed from a thickness direction. As a result, the optical waveguide film can be accurately positioned to the supporting substrate.

In addition to this, in the optical waveguide film, the adhesive function of the clad layer can eliminate the need for separately providing an adhesive layer to adhere the optical waveguide film to the supporting substrate. Therefore, the optical waveguide film can be miniaturized and the production cost can be reduced.

Further, it is preferable that when adhesively bonded to a silicon wafer with a lamination pressure of 400 kPa at a temperature of 130° C., the optical waveguide film of the present invention has a resistance of 0.1 N/20 mm or more against peeling-off in a direction 90° relative to a surface of the silicon wafer at a peel rate of 50 mm/min.

Since the optical waveguide film has the specific resistance after positioned to the silicon wafer, it can be reliably adhered to the silicon wafer.

Further, it is preferable that when adhesively bonded to a silicon wafer with a lamination pressure of 0.1 kPa at a temperature of 25° C., the optical waveguide film of the present invention has a resistance of 0.5 N/20 mm or less against peeling-off in a direction 90° relative to a surface of the silicon wafer at a peel rate of 50 mm/min.

The optical waveguide film has the specific resistance when adhesively bonded (temporarily adhered) to the silicon wafer during positioning thereto. Because of this, even though misaligned due to the bonding, the optical waveguide film can be easily removed to correct its position.

Further, in the optical waveguide film of the present invention, it is preferable that the clad layer comprises acrylic resin and/or epoxy resin.

Further, in the optical waveguide film of the present invention, it is preferable that the clad layer has a rough structure on a surface thereof.

Since the optical waveguide film is temporarily adhered to the supporting substrate by bringing the surface of the rough structure of the clad layer into contact with the supporting substrate, adhesive strength in the temporary adhesion can be reduced. This facilitates peeling during positioning and allows temporary adhesion and peeling (position correction) to be repeated, thereby ensuring excellent positioning accuracy.

Further, the method for manufacturing an optical waveguide film according to the present invention comprises the steps of forming a core layer; and forming a clad layer having an adhesive function and having a lower refractive index than that of the core layer by laminating a film of resin on a surface of the core layer.

Further, the method for manufacturing an optical waveguide film according to the present invention comprises the steps of forming a core layer; and forming a clad layer having an adhesive function and having a lower refractive index than that of the core layer by coating a liquid resin composition on a surface of the core layer, and then drying the resin composition thus coated.

Further, the optical substrate of the present invention comprises a supporting substrate; and the aforementioned optical waveguide film adhesively bonded to the supporting substrate.

Since the optical waveguide film accurately positioned is adhesively bonded to the supporting substrate, the optical substrate can ensure excellent connection reliability.

Further, the optical substrate of the present invention is obtained by forming a first positioning mark in a supporting substrate, forming a second positioning mark corresponding to the first positioning mark in the aforementioned optical waveguide film, then positioning the optical waveguide film to the supporting substrate by the first positioning mark and the second positioning mark, with a surface of the supporting substrate being in contact with a surface of the clad layer, and thereafter, curing the clad layer of the positioned optical waveguide film by heating and pressurizing, so that the optical waveguide film is adhered to the supporting substrate.

The optical substrate is formed by positioning the optical waveguide film to the supporting substrate by the first positioning mark and the second positioning mark, with the surface of the supporting substrate being in contact with the surface of the clad layer. This can reduce the distance between the first positioning mark and the second positioning mark in the thickness direction, at the same time, allowing the optical waveguide film to smoothly slide on the surface of the supporting substrate, thereby achieving precise positioning.

The optical substrate also allows the positioned optical waveguide film to directly adhere to the supporting substrate without using an adhesive layer, so that the optical substrate can be miniaturized and the production cost can be reduced.

Further, the optical substrate of the present invention is obtained by positioning the aforementioned optical waveguide film to a supporting substrate so that optical axes between optical elements pass through the core layer, with a surface of the supporting substrate being in contact with a surface of the clad layer, and thereafter, curing the clad layer of the positioned optical waveguide film by heating and pressurizing, so that the optical waveguide film is adhered to the supporting substrate.

The optical substrate is formed by positioning the optical waveguide film to the supporting substrate, with the surface of the supporting substrate being in contact with the surface of the clad layer. This allows the optical waveguide film to smoothly slide on the surface of the supporting substrate, thereby achieving precise positioning.

The optical substrate also allows the positioned optical waveguide film to directly adhere to the supporting substrate without using an adhesive layer, so that the optical substrate can be miniaturized and the production cost can be reduced.

Further, the method for manufacturing an optical substrate according to the present invention comprises the steps of forming a first positioning mark in a supporting substrate; forming a second positioning mark corresponding to the first positioning mark in the aforementioned optical waveguide film; positioning the optical waveguide film to the supporting substrate by the first positioning mark and the second positioning mark, with a surface of the supporting substrate being in contact with a surface of the clad layer; and curing the clad layer of the positioned optical waveguide film by heating and pressurizing, so that the optical waveguide film is adhered to the supporting substrate.

Further, the method for manufacturing an optical substrate according to the present invention comprises the steps of positioning the aforementioned optical waveguide film to a supporting substrate so that optical axes between optical elements pass through the core layer, with a surface of the supporting substrate being in contact with a surface of the clad layer, and curing the clad layer of the positioned optical waveguide film by heating and pressurizing, so that the optical waveguide film is adhered to the supporting substrate.

DETAILED DESCRIPTION OF PREFERRED EMBODIMENTS

Figure 1:
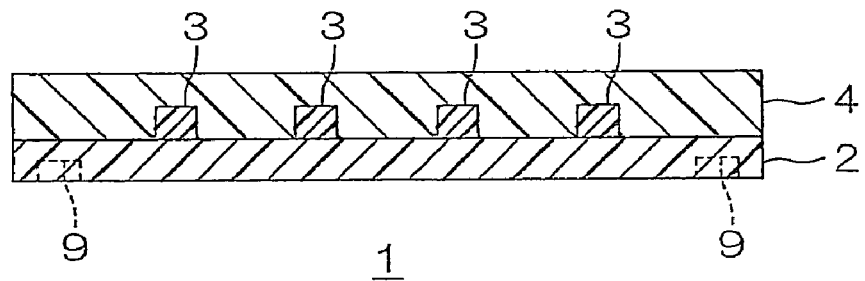
FIG. 1 is a sectional view along the widthwise direction illustrating one embodiment of an optical waveguide film according to the present invention.
Figure 2:
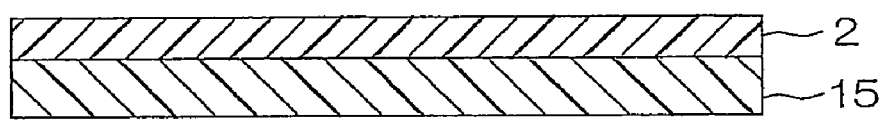
FIG. 2 is a process diagram illustrating the steps of manufacturing the optical waveguide film shown in FIG. 1, (a) showing the step of forming an under clad layer on a substrate, (b) showing the step of forming a core layer on the under clad layer, (c) showing the step of forming an over clad layer on the under clad layer so as to cover the core layer, and (d) showing the step of removing the substrate.
Figure 2:
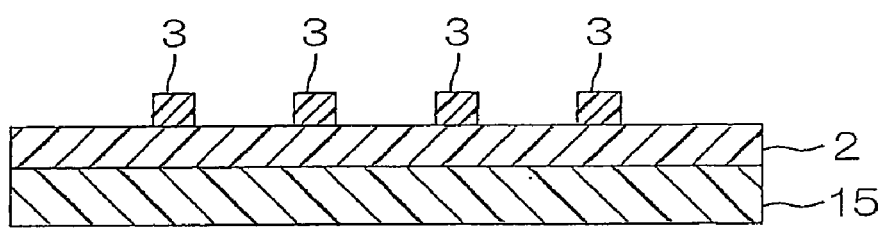
Figure 2:
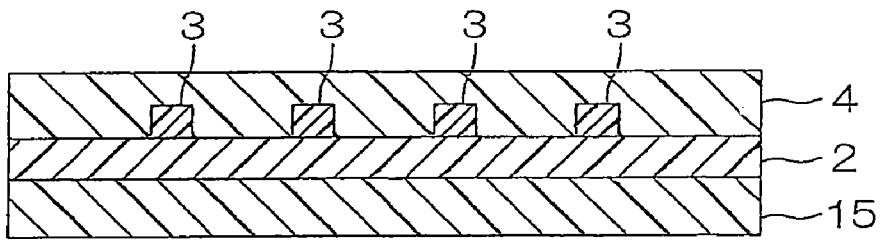
Figure 2:
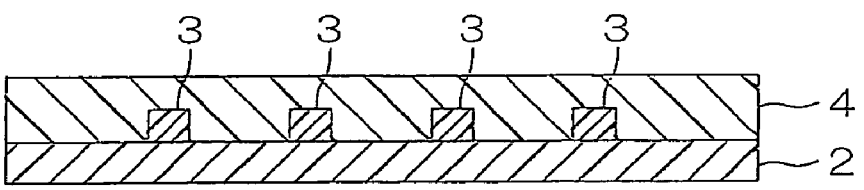

FIG. 1 is a sectional view along the widthwise direction (a direction perpendicular to a direction of extension of a core layer; the same applies hereinafter) illustrating one embodiment of an optical waveguide film according to the present invention, and FIG. 2 is a process diagram illustrating the steps of manufacturing the optical waveguide film shown in FIG. 1.

In FIG. 1, the optical waveguide film 1 is formed in a generally rectangular band shape in plane view, including an under clad layer 2, a core layer 3 formed on the under clad layer 2, and an over clad layer 4 as a clad layer formed on the under clad layer 2 so as to cover the core layer 3.

The core layer 3 is covered by the under clad layer 2 and the over clad layer 4. A plurality (4) of the core layers 3 are provided on the upper surface of the under clad layer 2, formed so as to extend in the lengthwise direction, and arranged in parallel at spaced intervals to each other in the widthwise direction. Both lengthwise end portions of the core layer 3 serve as connecting portions to be optically connected with a plurality of optical elements. Each of the core layers 3 is formed in a generally rectangular shape in sectional view.

The over clad layer 4 has an adhesive function and also serves as an adhesive layer capable of adhering to a supporting substrate 6 to be described later. The surface, that is, the upper surface of the over clad layer 4 is formed in a rough structure, and more specifically, formed in a rough structure having an arithmetic mean surface roughness of, for example, from 0.05 to 5 μm, or preferably from 0.1 to 3.0 μm. The arithmetic mean surface roughness is determined as arithmetic mean Ra of the surface roughness obtained from the surface observation using a laser microscope. The arithmetic mean roughness is determined according to JIS B0601-1994.

Next, a method for manufacturing the optical waveguide film 1 is described with reference to FIG. 2.

In this method, a substrate 15 is first prepared, as shown in FIG. 2(*a*). Then, an under clad layer 2 is formed on the substrate 15.

The substrate 15 has a plate shape, and examples of the material that may be used to form the substrate 15 include ceramic materials such as silicon and glass; metallic materials such as copper, aluminium, stainless steel and iron alloy; and resin materials such as polyimide, glass-epoxy and polyethylene terephthalate (PET). Ceramic materials are preferable. The substrate 15 has a thickness of, for example, from 10 to 5000 μm, or preferably from 10 to 1500 μm.

Examples of the material that may be used to form the under clad layer 2 include resin materials such as polyimide resin, polyamide resin, silicone resin, epoxy resin, acrylic resin, or those modified by fluorination or deuteration thereof, and further modified fluorene. Preferably, these resin materials are used as photosensitive resins obtained by mixing a photosensitizer.

To form the under clad layer 2 on the substrate 15, for example, a varnish (resin solution) of the above resin is prepared, and the varnish is coated over the substrate 15 by a method such as casting or spin coating. Thereafter, the coated varnish is dried and then heated as required. In the case of using a photosensitive resin, after the coating and the drying of the varnish, the coated varnish is exposed to light via a photomask and then heated as required. Thereafter, the heated varnish is developed and then heated.

The under clad layer 2 thus formed has a thickness of, for example, from 5 to 100 μm.

Then, in this method, as shown in FIG. 2(*b*), a core layer 3 is formed on the surface of the under clad layer 2.

Examples of the material that may be used to form the core layer 3 include resin materials having a higher refractive index than the resin material used for the under clad layer 2. Examples of the resin material include the same resin materials as those mentioned above.

To form the core layer 3, for example, a varnish (resin solution) of the above resin is prepared, and the varnish is coated over a surface of the under clad layer 2. Thereafter, the coated varnish is dried to be cured as required. In the case of using a photosensitive resin, after the coating and the drying of the varnish, the coated varnish is exposed to light via a photomask and then heated as required. Thereafter, the heated varnish is developed and then heated.

The core layer 3 thus formed has a thickness of, for example, from 5 to 100 μm, a width of, for example, from 5 to 100 μm, and a spacing in the widthwise direction of, for example, from 5 to 500 μm.

Then, in this method, as shown in FIG. 2(*c*), an over clad layer 4 is formed on the under clad layer 2 so as to cover the core layer 3.

The material that may be used to form the over clad layer 4 is not particularly limited as long as it has a lower refractive index than the resin material used for the core layer 3 and exhibits an adhesive function, and examples thereof include resin composition containing resin such as acrylic resin and epoxy resin.

The acrylic resin is prepared from, for example, an acrylic adhesive composition, and such acrylic adhesive composition contains, for example, an acrylic monomer component and a polymerization initiator.

The acrylic monomer component mainly contains alkyl (meth)acrylate, and the other components such as reactive functional group-containing vinyl monomer having a reactive functional group and polyfunctional monomer (except reactive functional group-containing vinyl monomer).

The alkyl(meth)acrylate is alkyl methacrylate and/or alkyl acrylate, and examples thereof include alkyl(meth)acrylate (having linear or branched alkyl moiety having 1 to 18 carbon atoms) such as methyl(meth)acrylate, ethyl(meth)acrylate, propyl(meth)acrylate, butyl(meth)acrylate, isobutyl(meth) acrylate, sec-butyl(meth)acrylate, t-butyl(meth)acrylate, pentyl(meth)acrylate, neopentyl(meth)acrylate, isopentyl (meth)acrylate, hexyl(meth)acrylate, heptyl(meth)acrylate, octyl(meth)acrylate, 2-ethylhexyl(meth)acrylate, isooctyl (meth)acrylate, nonyl(meth)acrylate, isononyl(meth)acrylate, decyl(meth)acrylate, isodecyl(meth)acrylate, undecyl (meth)acrylate, dodecyl(meth)acrylate, tridecyl(meth) acrylate, tetradecyl(meth)acrylate, pentadecyl(meth) acrylate, hexadecyl(meth)acrylate, heptadecyl(meth) acrylate, octadecyl(meth)acrylate(stearyl(meth)acrylate), and isooctadecyl(meth)acrylate (isostearyl(meth)acrylate). These alkyl(meth)acrylates can be used alone or in combination of two or more kinds.

The amount of the alkyl(meth)acrylate is, for example, from 50 to 99.5 parts by weight per 100 parts by weight of the acrylic monomer component.

Examples of the reactive functional group-containing vinyl monomer include carboxyl group-containing vinyl monomer, and examples of the carboxyl group-containing vinyl monomer include unsaturated carboxylic acids such as (meth)acrylic acid, fumaric acid, maleic acid, itaconic acid, crotonic acid and cinnamic acid; unsaturated dicarboxylic acid anhydrides such as fumaric anhydride, maleic anhydride and itaconic anhydride; unsaturated dicarboxylic acid monoesters such as monomethyl itaconate, monobutyl itaconate and 2-acryloyloxyethyl phthalate; unsaturated tricarboxylic acid monoesters such as 2-methacryloiloxyethyl trimellitate and 2-methacryloiloxyethyl pyromellitate; and carboxyalkyl acrylate such as carboxyethyl acrylate and carboxypentyl acrylate.

The amount of the reactive functional group-containing vinyl monomer is, for example, from 0.5 to 30 parts by weight per 100 parts by weight of the acrylic monomer component.

Examples of the polyfunctional monomer include (mono or poly)alkylene polyol poly(meth)acrylates such as ethylene glycol di(meth)acrylate, diethylene glycol di(meth)acrylate, triethylene glycol di(meth)acrylate, trimethylolpropane tri (meth)acrylate, tetraethylene glycol di(meth)acrylate, neopentyl glycol di(meth)acrylate, 1,6-hexandiol di(meth)acrylate, pentaerythritol di(meth)acrylate, tetramethylolmethane tri(meth)acrylate and dipentaerythritol hexa(meth)acrylate; and divinylbenzene. Examples of the polyfunctional monomer also include epoxy acrylate, polyester acrylate and urethane acrylate.

These polyfunctional monomers can be used alone or in combination of two or more kinds. The amount of the polyfunctional monomer is, for example, 29 parts by weight or less per 100 parts by weight of the acrylic monomer component.

Examples of the polymerization initiator include photopolymerization initiator and thermal polymerization initiator.

Examples of the photopolymerization initiator include benzoin ethers such as benzoin methyl ether, benzoin isopropyl ether and 2,2-dimethoxy-1,2-diphenylethan-1-one; substituted benzoin ethers such as anisole methyl ether; substituted acetophenones such as 2,2-diethoxy acetophenone, 2,2-dimethoxy-2-phenylacetophenone and 1-hydroxy-cyclohexyl-phenyl ketone; substituted alpha-ketols such as 2-methyl-2-hydroxy propiophenone; aromatic sulfonyl chlorides such as 2-naphthalenesulfonyl chloride; and photoactive oximes such as 1-phenyl-1,1-propanedione-2-(o-ethoxy-carbonyl)-oxime. Preferable are 2,2-dimethoxy-1,2-diphenylethan-1-one and 1-hydroxy-cyclohexyl-phenyl ketone.

Commercially available products are usually used as the photopolymerization initiator, and examples thereof include IRGACURE series (manufactured by Ciba Specialty Chemicals Inc.), and specific examples thereof include IRGACURE 651 (2,2-dimethoxy-1,2-diphenylethan-1-one) and IRGACURE 184 (1-hydroxy-cyclohexyl-phenyl ketone).

Examples of the thermal polymerization initiator include peroxide-based initiators such as benzoyl peroxide and lauroyl peroxide; and azo-based initiators such as 2,2'-azobis (isobutyronitrile) and azobis(2-methyl butyronitrile).

These polymerization initiators can be used alone or in combination of two or more kinds. The amount of the polymerization initiator is, for example, from 0.01 to 5 parts by weight, or preferably from 0.1 to 3 parts by weight, per 100 parts by weight of the acrylic monomer component.

Additives such as viscosity modifier can be added to the acrylic adhesive composition at an appropriate ratio.

Examples of the viscosity modifier include styrene block polymer.

The acrylic adhesive composition is prepared by mixing an acrylic adhesive composition, a polymerization initiator and, if necessary, an additive. The acrylic adhesive composition can also be prepared as a varnish of the acrylic adhesive composition that is mixed with a solvent (e.g., methyl ethyl ketone and propione carbonate) at an appropriate ratio.

The epoxy resin is prepared from, for example an epoxy adhesive composition, and such epoxy adhesive composition contains an epoxy monomer component and a polymerization initiator.

Examples of the epoxy monomer component include alicyclic epoxy monomer, aromatic epoxy monomer and nitrogen-containing cyclic epoxy monomer, and alicyclic epoxy monomer and aromatic epoxy monomer are preferable.

Examples of the alicyclic epoxy monomer include alicyclic epoxy monomer having a cyclohexene oxide skeleton, and 3,4-epoxy cyclohexenyl methyl-3',4'-epoxy cyclohexene carboxylate is preferable.

Examples of the aromatic epoxy monomer include modified fluorene monomer having a fluorene skeleton, and bisphenoxyethanol fluorene diglycidyl ether and bisphenol fluorene diglycidyl ether are preferable.

Examples of the polymerization initiator include thermal polymerization initiator and photopolymerization initiator, and a photopolymerization initiator is preferable. Examples of the photopolymerization initiator include a photo-acid generator, and specific examples thereof include onium salts such as diazonium salt, sulfonium salt, iodonium salt, phosphonium salt and selenium salt. Further, examples of the counter ion thereto include anions such as $CF3SO_3-$, $BF_4-$, $PF_6-$, $AsF_6-$ and $SbF_6-$. Examples of the photo-acid generator include sulfonium salts with $SbF_6-$, more specifically, 4,4'-bis[di(β-hydroxyethoxy)phenylsulfinio]phenylsulfid-bis-hexafluoro antimonate. These polymerization initiators can be used alone or in combination of two or more kinds.

The amount of the polymerization initiator is, for example, from 0.1 to 10 parts by weight per 100 parts by weight of the epoxy monomer component.

Additives such as curing agent (accelerator) can be added to the epoxy adhesive composition at an appropriate ratio.

Examples of the curing agent include imidazole-based thermosetting catalyst.

The epoxy adhesive composition is prepared by mixing an epoxy monomer component, a polymerization initiator and, if necessary, an additive. The epoxy adhesive composition can also be prepared as a varnish of the epoxy adhesive composition that is mixed with a solvent (e.g., methyl ethyl ketone and propione carbonate) at an appropriate ratio.

To form the over clad layer 4, for example, the resin composition thus prepared as described above is coated over a surface of a casting plate, and then the resin composition thus coated is polymerized to form a film. Thereafter, the film is transferred onto a surface of the core layer 3 to be laminated. Alternatively, the resin composition is coated over the surface of the core layer 3 and then polymerized.

The same materials as those used for the substrate are used to form the casting plate. Preferably, PET may be used. The surface of the casting plate, more specifically, the surface to be in contact with the coated resin composition, is formed in a rough structure having an arithmetic mean surface roughness of from 0.05 to 5 μm. The preferable range of the arithmetic mean surface roughness of the upper surface of the casting plate is the same as that of the surface of the over clad layer 4 as described above. The arithmetic mean surface roughness thereof is determined in the same manner as above. The rough structure on the surface of the casting plate can be formed by a known method such as embossing.

The method of coating the resin composition over the surface of the casting plate includes coating method such as casting or spin coating. When prepared as a varnish, the resin composition is heated at 80 to 120° C. for 5 to 30 minutes to dry as required after the coating.

In the case of the resin composition containing a photopolymerization initiator, the resin composition is polymerized by irradiation with ultraviolet light or the like having a dose of, for example, from 10 to 10000 mJ/cm². On the other hand, in the case of the resin composition containing a thermal polymerization initiator, the resin composition is polymerized by heating at 60 to 150° C. for 5 to 30 minutes. This forms a film on the surface (upper surface) of the casting plate.

Subsequently, the film laminated on the casting plate is vertically inverted, and the film thus inverted is then laminated on the under clad layer 2 so as to cover the core layer 3. Thereafter, the casting plate is removed from the film. In laminating the film, the film can be heated and pressurized, for example, with 0.1 to 0.5 MPa at 60 to 100° C. as required.

Likewise, the method of coating the resin composition (liquid resin composition) over the surface of the core layer 3 includes coating method such as casting or spin coating. When prepared as a varnish, the resin composition is heated at 80 to 120° C. for 5 to 30 minutes to dry as required after the coating.

Thereafter, the same casting plate as above is laminated on the surface of the resin composition so that the surface of the rough structure is in contact with the surface of the resin composition thus coated. After allowed to stand for 5 to 30 minutes, the casting plate thus laminated is removed from the resin composition.

Therefore, the over clad layer 4 having an adhesive function and having a lower refractive index than that of the core layer 3 can be formed on the surface of the core layer 3.

The thickness of the over clad layer 4 thus formed is at least 10 μm thicker than that of the core layer 3 and is, for example, from 15 to 110 μm.

Then, in this method, as shown in FIG. 2(d), the substrate 15 is removed. For example, etching or peeling is used to remove the substrate 15.

Thus, an optical waveguide film 1 including the under clad layer 2, the core layer 3 and the over clad layer 4 can be prepared.

In the case where the over clad layer 4 is adhesively bonded to a silicon wafer with a lamination pressure of 400 kPa at a temperature of 130° C., the optical waveguide film 1 has a resistance (i.e., adhesive strength, or completely adhesive lamination strength to be described in detail in the following EXAMPLES) of, for example, 0.1 N/20 mm or more, or preferably 0.2 N/20 mm or more and usually 5 N/20 mm or less against peeling-off in a direction 90° relative to the surface of the silicon wafer at a peel rate of 50 mm/min. When the completely adhesive lamination strength is within the above range, the optical waveguide film 1 can be reliably adhered to the silicon wafer after positioning thereto.

In the case where the over clad layer 4 is adhesively bonded to a silicon wafer with a lamination pressure of 0.1 kPa at a temperature of 25° C., the optical waveguide film 1 has a resistance (i.e., adhesive strength or temporarily adhesive lamination strength to be described in detail in the following EXAMPLES) of, for example, 0.5 N/20 mm or less, or preferably 0.4 N/20 mm or less and usually 0.1 N/20 mm or more against peeling-off in a direction 90° relative to the surface of the silicon wafer at a peel rate of 50 mm/min. When the temporarily adhesive lamination strength is within the above range, the following is possible: When the optical waveguide film 1 is temporarily adhered to the silicon wafer during positioning thereto, if misaligned, the optical waveguide film 1 can be easily removed to correct its position.

Figure 3:
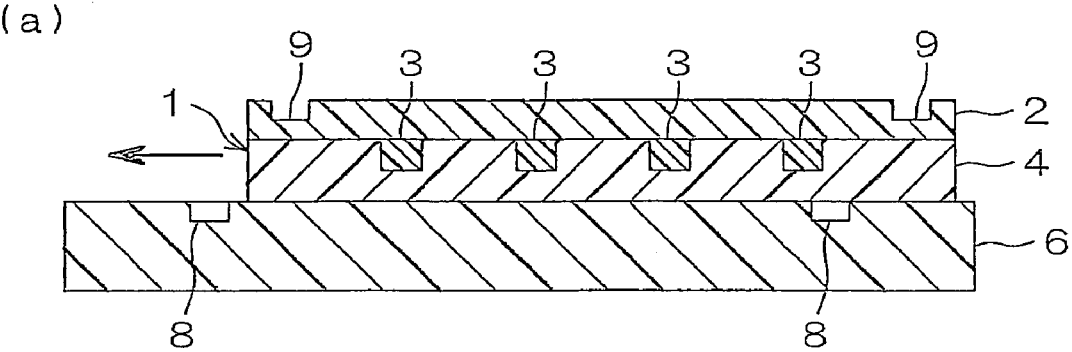
FIG. 3 is a process diagram illustrating the steps of adhesively bonding the optical waveguide film shown in FIG. 1 to a supporting substrate to manufacture an optical substrate, (a) showing the step of positioning the optical waveguide film to the supporting substrate by a first positioning mark and a second positioning mark, (b) showing the step of temporarily adhering the optical waveguide film thus positioned to the supporting substrate, and (c) showing the step of curing an over clad layer by heating and pressurizing to adhere the optical waveguide film to the supporting substrate.
Figure 3:
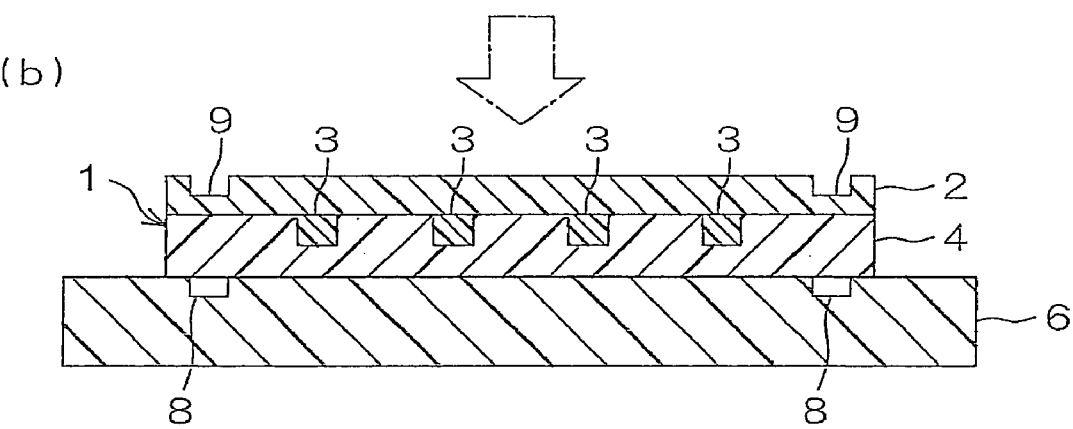
Figure 3:
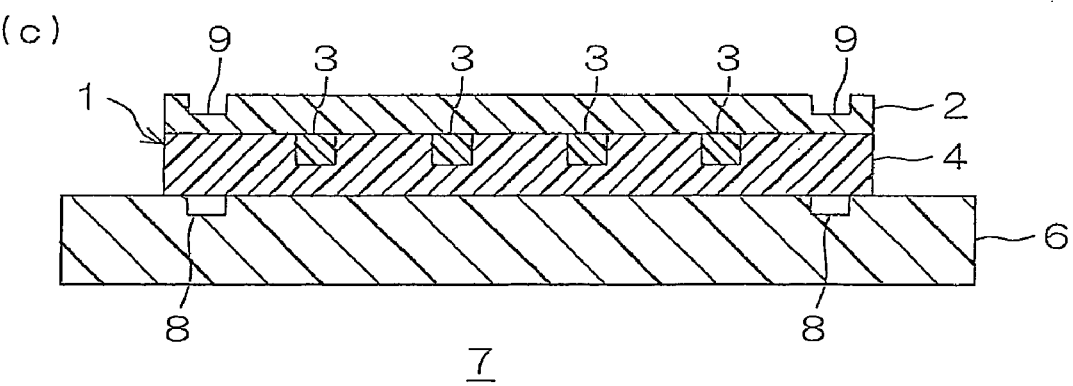

Next, a method for adhesively bonding the optical waveguide film 1 to a supporting substrate 6 to manufacture an optical substrate 7 as an embodiment of the optical substrate according to the present invention, is described with reference to FIG. 3.

First, in this method, referring to FIG. 3(a), a supporting substrate 6 is prepared and a first positioning mark 8 is formed therein.

The supporting substrate 6 is made of a thin plate of inorganic material such as a silicon wafer. The supporting substrate 6 is formed in a generally rectangular band shape slightly larger than the optical waveguide film 1, as viewed in plane. The supporting substrate 6 has a thickness of, for example, from 25 to 5000 μm.

The first positioning mark 8, which is a mark used for positioning of the optical waveguide film 1, is formed as a groove in the upper surface of each of the widthwise end portions of the supporting substrate 6. The first positioning mark 8 is formed in an appropriate shape such as cross, circle or rectangle in plane view. The first positioning mark 8 may be previously formed in the supporting substrate 6.

In addition, in this method, referring to FIG. 1 (the dashed lines) and FIG. 3(a), a second positioning mark 9 is formed in the under clad layer 2 of the optical waveguide film 1. More specifically, the second positioning mark 9 is formed as a groove in the lower surface of each of the widthwise end portions of the under clad layer 2. The second positioning mark 9, which is a mark used for positioning of the optical waveguide film 1, is formed in a shape identical to the first positioning mark 8 as viewed in plane, corresponding to the first positioning mark 8. The second positioning mark 9 may be formed simultaneously with the formation of the under clad layer 2.

Then, in this method, as shown in FIG. 3(a), the optical waveguide film 1 is positioned to the supporting substrate 6 by the first positioning mark 8 and the second positioning mark 9, with the surface of the supporting substrate 6 being in contact with the surface of the over clad layer 4.

Specifically, first, the optical waveguide film 1 is vertically inverted so that the optical waveguide film 1 and the supporting substrate 6 are arranged in opposed relation to each other, and then the lower surface (the upper surface before vertically inverted, that is, the lower surface after vertically inverted) of the over clad layer 4 is abutted against the upper surface of the supporting substrate 6 to be in contact with each other.

Subsequently, the first positioning mark 8 and the second positioning mark 9 are viewed from above. At the viewing, when the first positioning mark 8 and the second positioning mark 9 are not overlapping each other in plane view, that is, when the optical waveguide film 1 is not positioned to the supporting substrate 6, the optical waveguide film 1 is slid on the upper surface of the supporting substrate 6 as indicated by the arrow in FIG. 3(a), with the lower surface of the over clad layer 4 being in contact with the upper surface of the supporting substrate 6.

Thereafter, the first positioning mark 8 and the second positioning mark 9 are viewed from above. As shown in FIG. 3(b), when the first positioning mark 8 and the second positioning mark 9 are overlapping each other in plane view, that is, when the optical waveguide film 1 is positioned to the supporting substrate 6, the positioned optical waveguide film 1 is temporarily adhered to the supporting substrate 6. As indicated by the arrow in phantom in FIG. 3(b), the optical waveguide film 1 is temporarily adhered thereto by adhesively bonding downward with a pressure of, for example, from 0.1 to 1 KPa. After the temporary adhesion, the first positioning mark 8 and the second positioning mark 9 are checked for overlapping each other in plane view. In this case, when the first positioning mark 8 and the second positioning mark 9 are not overlapping in plane view (cf. FIG. 3(a)), once the optical waveguide film 1 is pulled upward to be removed from the supporting substrate 6, and the above positioning operation is repeated again.

Thereafter, when the first positioning mark 8 and the second positioning mark 9 are overlapping each other in plane view, the over clad layer 4 of the optical waveguide film 1 thus positioned is cured by heating and pressurizing, so that the optical waveguide film 1 is adhered to the supporting substrate 6 as shown in FIG. 3(c).

The heating temperature is set in the range of, for example, 80 to 150° C., or preferably 100, to 130° C., and the pressure is set in the range of, for example, 1 to 500 KPa, or preferably 100 to 300 KPa.

Therefore, the optical substrate 7 including the supporting substrate 6 and the optical waveguide film 1 thus adhesively bonded thereto can be obtained.

In the optical waveguide film 1 obtained by this method, since the over clad layer 4 has an adhesive function, the over clad layer 4 can be directly adhered to the supporting substrate 6 during the positioning to the supporting substrate 6. Therefore, when the second positioning mark 9 and the first positioning mark 8 are formed in the optical waveguide film 1 and the supporting substrate 6, respectively, the first positioning mark 8 and the second positioning mark 9 can be accurately viewed from the thickness direction. As a result, the optical waveguide film 1 can be accurately positioned to the supporting substrate 6.

Further, in the optical waveguide film 1, the adhesive function of the over clad layer 4 can eliminate the need for separately providing an adhesive layer to adhere the optical waveguide film 1 to the supporting substrate 6. Therefore, the optical waveguide film 1 can be miniaturized and the production cost can be reduced.

Since the optical waveguide film 1 accurately positioned is adhesively bonded to the supporting substrate 6, the optical substrate 7 can ensure excellent connection reliability.

In the above explanation, the over clad layer 4 has an adhesive function. However, in addition to the over clad layer 4, or in place of the over clad layer 4, the under clad layer 2 can also have the adhesive function. When the under clad layer 2 has the adhesive function in place of the over clad layer 4, the surface of the under clad layer 2 is brought into contact with the surface of the optical substrate 7 without vertically inverting the optical waveguide film 1 during the production of the optical substrate 7.

In the above explanation, the surface of the over clad layer 4 is formed in a rough structure. However, the surface thereof is not limited thereto, and can also be formed in, for example, a flat shape. Preferably, the surface of the over clad layer 4 is formed in a rough structure. The formation of the rough structure on the surface of the over clad layer 4 allows adhesive strength (temporarily adhesive lamination strength) in the temporary adhesion to be reduced because the rough structured surface of the over clad layer 4 is contacted with the supporting substrate 6 for temporarily adhering thereto. This facilitates peeling during positioning, so that temporary adhesion and peeling (position correction) can be repeated, thereby obtaining excellent positioning accuracy.

Further, the under clad layer 2 can have an adhesive function and can also be formed with a rough structure on a surface thereof.

Next, a method for manufacturing another embodiment of an optical substrate according to the present invention is described with reference to FIGS. 4 and 5. The same reference numerals are provided in the figures below for members corresponding to each of those described above, and their detailed description is omitted.

Figure 4:
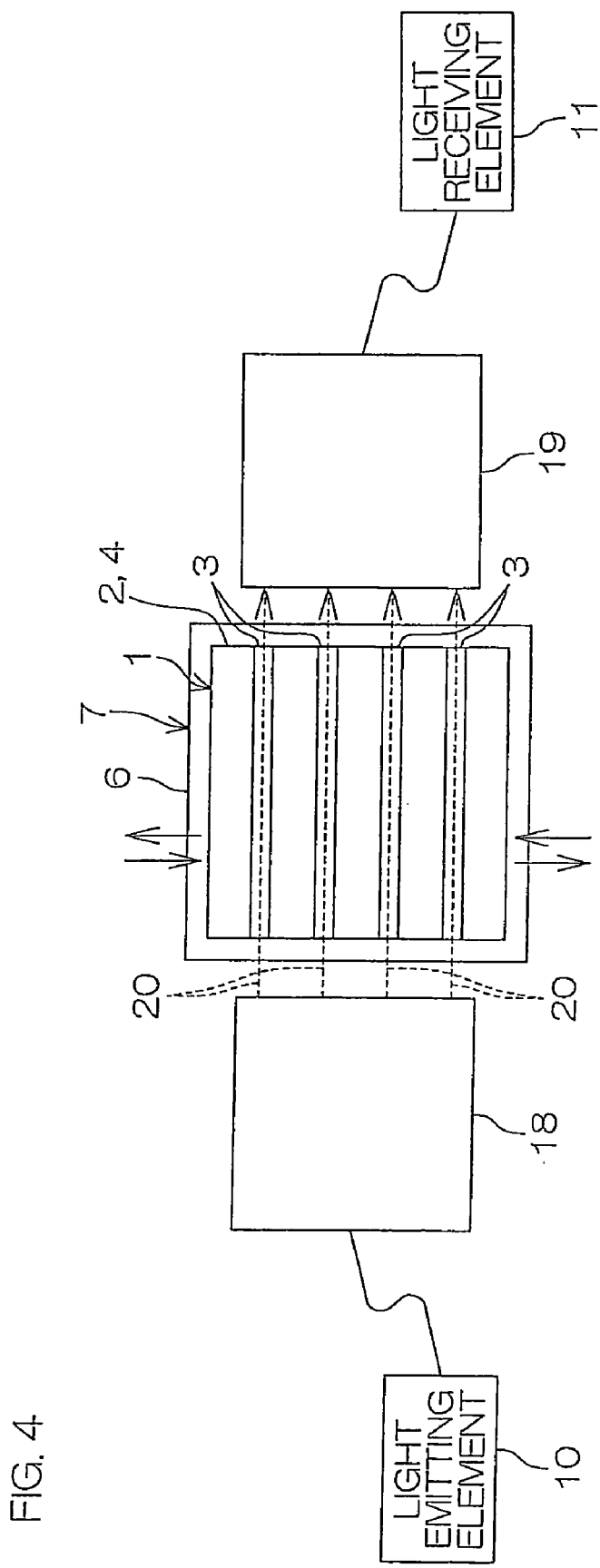
FIG. 4 is a view explaining a method for manufacturing an optical substrate by positioning the optical waveguide film shown in FIG. 1 to a supporting substrate using optical axes.
Figure 5:
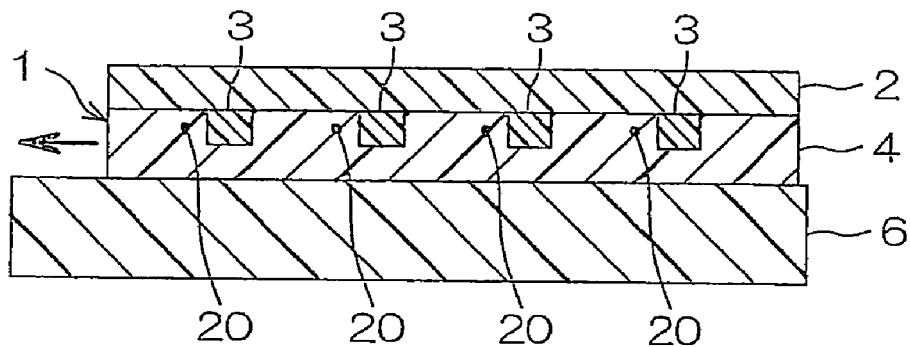
FIG. 5 is a process diagram illustrating the steps of adhesively bonding an optical waveguide film shown in FIG. 1 to a supporting substrate to manufacture an optical substrate, (a) showing the step of positioning the optical waveguide film to the supporting substrate by an optical axis, (b) showing the step of temporarily adhering the optical waveguide film thus positioned to the supporting substrate, and (c) showing the step of curing an over clad layer by heating and pressurizing to adhere the optical waveguide film to the supporting substrate.
Figure 5:
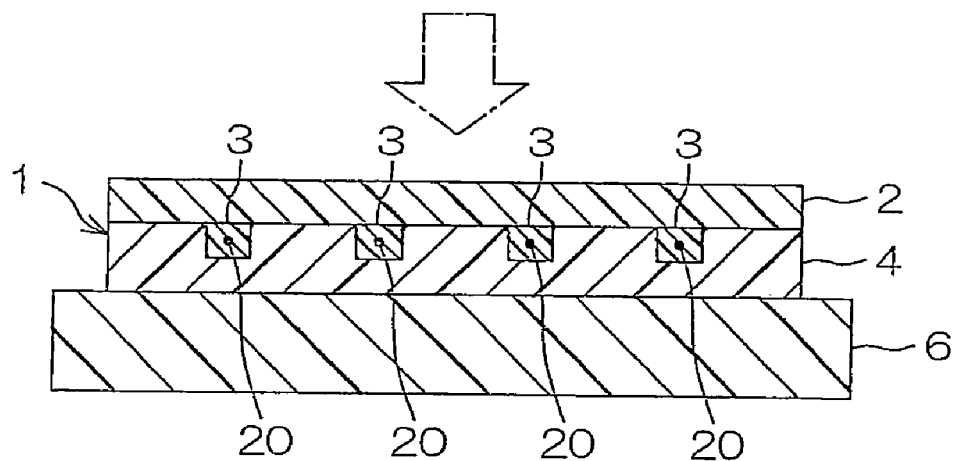
Figure 5:
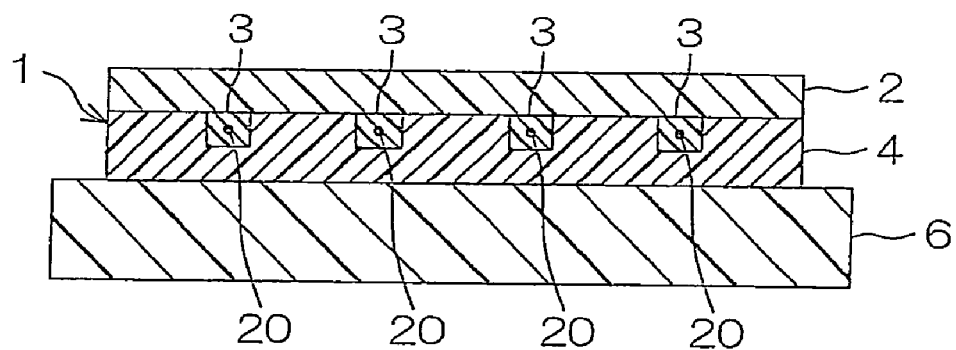

In FIG. 4, a light emitting element 10 as an optical element and a light-emitting-side optical fiber 18 connected to the light emitting element 10 are provided on one side in the lengthwise direction of the supporting substrate 6, and a light receiving element 11 as an optical element and a light-receiving-side optical fiber 19 connected to the light receiving element 11 are provided on the other side in the lengthwise direction thereof.

The light emitting element 10 is a surface emitting laser (VCSEL), a light emitting diode (LED) or the like, and light emitted by the light emitting element 10 radiates from the light-emitting-side optical fiber 18 to the light-receiving-side optical fiber 19.

The light receiving element 11 is a photodiode (PD) or the like, which receives light entered from the light-receiving-side optical fiber 19 and detects the amount of incident light.

The light-emitting-side optical fiber 18 and the light-receiving-side optical fiber 19 are multimode fibers in which a plurality (4) of optical axes are arranged.

Thus, as indicated by dotted lines in FIG. 4, a plurality (4) of optical axes 20 are arranged on the supporting substrate 6 between the light emitting element 10 and the light receiving element 11, more specifically, between the light-emitting-side optical fiber 18 and the light-receiving-side optical fiber 19. The optical axes 20 are arranged, for example, by adjusting the arrangement of the light-emitting-side optical fiber 18 and the light-receiving-side optical fiber 19 using an alignment unit.

In this method, as shown in FIG. 5(a), first, the optical waveguide film 1 is positioned to the supporting substrate 6 so that the optical axes 20 between the light emitting element 10 and the light receiving element 11 pass through the core layer 3, with the surface of the supporting substrate 6 being in contact with the surface of the over clad layer 4.

More specifically, referring to FIG. 4, whether the light receiving element 11 satisfactorily detects incident light from the light emitting element 10 or not, that is, whether the optical axes 20 pass through the core layer 3 or not is determined. When it is determined that the optical axes 20 are not passing through the core layer 3, the optical waveguide film 1 is slid on the upper surface of the supporting substrate 6 as indicated by the arrows in FIGS. 4 and 5(a), with the lower surface of the over clad layer 4 being in contact with the upper surface of the supporting substrate 6.

Thereafter, whether the optical axes 20 pass through the core layer 3 or not is determined again. Then, when the light receiving element 11 satisfactorily detects incident light from the light emitting element 10 as shown in FIG. 5(b), that is, when the optical axes 20 are passing through the core layer 3, the optical waveguide film 1 thus positioned is temporarily adhered to the supporting substrate 6. After the temporary adhesion, whether the optical axes 20 are passing through the core layer 3 or not is confirmed again. In this case, when the optical axes 20 are not passing through the core layer 3 (cf. FIG. 5(a)), once the optical waveguide film 1 is pulled upward to be removed from the supporting substrate 6, and the above positioning operation is repeated again.

Thereafter, when the optical axes 20 are passing through the core layer 3, the over clad layer 4 of the optical waveguide film 1 thus positioned is cured by heating and pressurizing, so that the optical waveguide film 1 is adhered to the supporting substrate 6 as shown in FIG. 5(c).

Since this method uses the optical axes 20 to position the optical waveguide film 1 to the supporting substrate 6, the optical substrate 7 having excellent reliability can be reliably and easily obtained.

EXAMPLES

The present invention will now be described in more detail by way of Examples and Comparative Example. However, the present invention is not limited to the following Examples and Comparative Example. In the following description, the units "part(s)" and "%" are by weight, unless otherwise noted.

Example 1

Production of Optical Waveguide Film

An epoxy resin composition A prepared according to the formulation shown in Table 1 was coated onto a 140 mm×140 mm glass plate with a spin coater and then irradiated with ultraviolet light. Subsequently, the epoxy resin composition was heated at 120° C. for 15 minutes to be cured (pre-cured), thereby forming an under clad layer having a thickness of 25 μm (cf. FIG. 2(a)). The under clad layer had a refractive index of 1.542 at a wavelength of 830 nm.

Next, an epoxy resin composition B prepared according to the formulation shown in Table 1 was coated onto the under clad layer with a spin coater and then exposed to ultraviolet light via photomask. Subsequently, the epoxy resin composition B thus exposed was developed in an aqueous γ-butyrolactone solution, and was heated at 120° C. for 15 minutes to be cured (pre-cured), thereby forming a core layer having a thickness of 50 μm (cf. FIG. 2(b)). The core layer had a width of 50 μm, a spacing between the core layers of 200 μm, and a refractive index of 1.602 at a wavelength of 830 nm.

Next, a PET film (EMBLET SM-38, thickness: 38 μm, manufactured by Unitika, Ltd.) subjected to processing (sand mat treatment) to form a rough structure on the upper surface thereof was prepared. An acrylic adhesive composition C prepared according to the formulation shown in Table 1 was then coated onto the upper surface of the PET film, and thereafter, photopolymerized with ultraviolet light to produce a film made of acrylic resin (cf. FIG. 2(c)). The film had a thickness of 40 μm. Subsequently, the film of acrylic resin laminated on the PET film was vertically inverted, and the acrylic resin film thus inverted was then laminated with a lamination pressure of 400 kPa at a temperature of 100 to 130° C. so as to cover the core layer on the under clad layer. Thereafter, the PET film was removed from the acrylic resin film. The over clad layer had a refractive index of 1.602 at a wavelength of 830 nm, and the upper surface thereof had an arithmetic mean surface roughness Ra of from 0.1 to 3.0 μm. The arithmetic mean surface roughness Ra was calculated from surface observation using a laser microscope (1LM21H, manufactured by Lasertec Corporation).

Thereafter, the glass plate was peeled off from the under clad layer to produce an optical waveguide film made of the under clad layer, the core layer and the over clad layer.

Production of Optical Substrate

A femtosecond laser with a wavelength of 780 nm was used to form a first positioning mark in a silicon wafer. Further, a KrF excimer laser was used to form a second positioning mark in the under clad layer of the optical waveguide film thus produced.

Subsequently, the optical waveguide film was arranged on the surface of the silicon wafer, and then positioned to the silicon wafer by sliding the optical waveguide film on the surface of the silicon wafer while the first positioning mark and the second positioning mark were observed with an optical microscope (cf. FIG. 3(a)).

The optical waveguide film was then temporarily adhered to the silicon wafer with a lamination pressure of 0.1 kPa at a temperature of 25° C. (cf. FIG. 3(b)). Thereafter, the optical waveguide film was completely adhered to the silicon wafer with a lamination pressure of 400 kPa at a temperature of 130° C. (cf. FIG. 3(c)).

Thus, an optical substrate with the optical waveguide film adhesively bonded to the silicon wafer was produced.

The length of deviation between the first positioning mark and the second positioning mark after the complete adhesion was measured with a length-measuring microscope, and the deviation before and after the complete adhesion was then calculated. The deviation thus calculated was found to be less than 5 μm.

Further, the thickness of the optical waveguide film after the complete adhesion was measured with a length-measuring microscope, and the variation in the thicknesses before and after the complete adhesion was then calculated. The variation thus calculated was found to be less than 5 μm.

Example 2

In the same manner as in Example 1, except that NA590 (acrylic resin tape, thickness: 25 μm, manufactured by NITTO DENKO CORP.) was used as the film of acrylic resin in the formation of the over clad layer in Example 1, an over clad layer was formed, an optical waveguide film was then produced, and subsequently, an optical substrate was produced. The over clad layer had a thickness of 25 μm.

Example 3

In the same manner as in Example 1, except that a normal PET film (PET film not processed into a rough structure) was used in place of the PET film processed into a rough structure in the formation of the over clad layer in Example 1, an over clad layer was formed, an optical waveguide film was then produced, and subsequently, an optical substrate was produced. The upper surface of the over clad layer was formed in a flat shape. The over clad layer had a thickness of 40 μm.

Example 4

In the same manner as in Example 1, except that after an epoxy adhesive composition D prepared according to the formulation shown in Table 1 was coated onto the under clad layer including the core layer with a spin coater, the epoxy adhesive composition D thus coated was dried (prebaked) at 90° C. for 10 minutes to form an over clad layer, and further, after the complete adhesion, the over clad layer was aged at 150° C. for 30 minutes to be thermally cured (post-baked) in the formation of the over clad layer in Example 1, an over clad layer was formed, an optical waveguide film was then produced, and subsequently, an optical substrate was produced. The over clad layer had a thickness of 50 μm.

Example 5

An optical waveguide film was formed in the same manner as in Example 1. Subsequently, a manual alignment unit was used to provide a VCSEL side optical fiber connected to a VCSEL (wavelength: 850 nm) and a PD side optical fiber connected to a PD so that the optical axes were arranged on the silicon wafer (cf. FIG. 4).

Subsequently, the optical waveguide film was arranged on a surface of a silicon wafer, and then slid on the surface thereof, with the VCSEL emitting light. When the optical axes pass through the core layer and the PD detects the maximum amount of received light, the optical waveguide film was positioned to the silicon wafer (cf. FIG. 5(a)).

Then, the optical waveguide film was temporarily adhered to the silicon wafer with a lamination pressure of 0.1 kPa at a temperature of 25° C. (cf. FIG. 5(b)). Thereafter, the optical waveguide film was completely adhered to the silicon wafer with a lamination pressure of 400 kPa at a temperature of 130° C. (cf. FIG. 5(c)).

Thus, an optical substrate in which the optical waveguide film was adhesively bonded to the silicon wafer was produced. In the optical substrate, the optical waveguide film was accurately positioned to the silicon wafer.

Comparative Example 1

In the formation of the over clad layer in Example 1, the epoxy resin composition A was coated with a spin coater, and then irradiated with ultraviolet light. Subsequently, the epoxy resin composition was heated at 120° C. for 15 minutes to be cured, thereby forming an over clad layer and then producing an optical substrate. The over clad layer was formed as a substantially tack (surface tack) free resin. The over clad layer had a thickness of 75 μm.

TABLE 1

| | | | Epoxy Resin Composition A | Epoxy Resin Composition B | Acrylic Adhesive Composition C | Epoxy Resin Composition D |
|---|---|---|---|---|---|---|
| Epoxy Resin Composition | Epoxy Monomer Component | Bisphenoxyethanol Fluorene Diglycidyl Ether | 35 | 70 | — | — |
| | | CELLOXIDE 2021P *1 | 40 | — | | — |
| | | CELLOXIDE 2081 *2 | 25 | — | | — |
| | | 1,3,3-tris[4-(2-(3-oxetanyl]butoxyphenyl]butane | — | 30 | | — |
| | | Bisphenol A Epoxy Resin *3 | — | — | | 50 |
| | | Dimer Acid-Modified Epoxy Resin *4 | — | — | | 50 |
| | | Acid Anhydride Type Epoxy Resin *5 | — | — | | 14.8 |
| | Photopolymerization Initiator | Photo-Acid Generator *6 | 2 | 1 | | — |
| | Curing Agent | Imidazole-Based Thermosetting Catalyst *7 | — | — | | 3 |
| | Solvent | Methyl Ethyl Ketone | — | — | | 39.3 |
| Acrylic Resin Composition | Acrylic Monomer Component | Isostearyl Acrylate | — | | 75 | — |
| | | Acrylic Acid | | | 12 | |
| | | 1,6-Hexandiol Diacrylate | | | 0.1 | |
| | Photopolymerization Initiator | IRGACURE 651 *8 | | | 0.05 | |
| | | IRGACURE 184 *9 | | | 0.05 | |
| | Viscosity Modifier | Styrene Block Polymer *10 | | | 25 | |

*1: 3,4-epoxy cyclohexenyl methyl-3',4'-epoxy cyclohexene carboxylate, manufactured by Daicel Chemical Industries, Ltd.
*2: Alicyclic epoxy monomer having a cyclohexene oxide skeleton, manufactured by Daicel Chemical Industries, Ltd.
*3: Epikote 1010, manufactured by Japan Epoxy Resins Co., Ltd.
*4: YD172, manufactured by Tohto Kasei Co., Ltd.
*5: RIKACID MH700, manufactured by New Japan Chemical Co., Ltd.
*6: 50% propione carbonate solution of 4,4'-bis[di(β-hydroxyethoxy)phenylsulfinio]phenylsulfid-bis-hexafluoro antimonate
*7: Curezol IB2PZ, manufactured by SHIKOKU CHEMICALS CORPORATION
*8: 2,2-dimethoxy-1,2-diphenylethan-1-one, manufactured by Ciba Specialty Chemicals Inc.
*9: 1-hydroxy-cyclohexyl-phenyl ketone, manufactured by Ciba Specialty Chemicals Inc.
*10: Styrene block polymer SEBS, manufactured by Sumitomo Chemical Co., Ltd.

Evaluation

1) Amount of Light Loss

The optical waveguide film in each of Examples 1 to 4 and Comparative Example 1 was cut with a dicing saw (DAD522, manufactured by DISCO Corporation) so that the core layer had a length of 100 mm. The cut film was optically connected to a VCSEL having a wavelength of 850 nm using a multi-mode fiber. The light was condensed by a lens and the condensed light was detected with a PD to measure the amount of light loss. The results are shown in Table 2.

2) Slidability, Temporarily Adhesive Function and Lamination Strength in Temporary Adhesion and Complete Adhesion with Respect to Silicon Wafer In the positioning in Examples 1 to 4 and Comparative Example 1, the slidability and the temporarily adhesive function of the optical waveguide film with respect to the silicon wafer were evaluated. In the evaluation of the slidability, "A" indicates excellent slidability, and "B" indicates poor slidability. In the evaluation of the temporarily adhesive function, "A" indicates that the temporary adhesion has been succeeded, and "B" indicates that the temporary adhesion has been failed.

The temporarily adhesive lamination strength was measured by a 90° peel test with the optical waveguide film temporarily adhered onto the supporting substrate. In the 90° peel test, the optical waveguide film after the temporary adhesion was peeled off at a peel rate of 50 mm/min in a direction 90° relative to the surface of the silicon wafer, and then the resistance against the peeling-off was calculated.

The completely adhesive lamination strength was measured by a 90° peel test with the optical waveguide film completely adhered onto the supporting substrate. In the 90° peel test, the optical waveguide film after the complete adhesion was peeled off at a peel rate of 50 mm/min in a direction 90° relative to the surface of the silicon wafer, and then the resistance against the peeling-off was calculated. The results are shown in Table 2.

3) Amount of Deviation and Variation in Thickness Before and After Complete Adhesion The results of the amount of deviation and the variation in the thicknesses before and after complete adhesion in each of Examples 1 to 4 and Comparative Example 1 are shown in Table 2.

TABLE 2

| Ex/Comp. Ex. | Thickness of Over Clad Layer [μm] | Amount of Light Loss [dB/100 mm] | Slidability | Temporarily Adhesive Function | Temporarily Adhesive Lamination Strength [N/20 mm] | Completely Adhesive Lamination Strength [N/20 mm] | Deviation Before/After Complete Adhesion [μm] | Variation in Thickness Before/After Complete Adhesion [μm] |
|---|---|---|---|---|---|---|---|---|
| Ex. 1 | 40 | 2.5 | A | A | 0.4 | 2.4 | 3 | 2 |
| Ex. 2 | 25 | 5.5 | A | A | 0.3 | 2.7 | 1 | 3 |
| Ex. 3 | 40 | 3.0 | B | A | 1.4 | 2.3 | 3 | 1 |
| Ex. 4 | 50 | 1.9 | B | A (Peeling Impossible) | 10 or more | 10 or more | 2 | 1 |

TABLE 2-continued

| Ex/ Comp. Ex. | Thickness of Over Clad Layer [μm] | Amount of Light Loss [dB/100 mm] | Slidability | Temporarily Adhesive Function | Temporarily Adhesive Lamination Strength [N/20 mm] | Completely Adhesive Lamination Strength [N/20 mm] | Deviation Before/After Complete Adhesion [μm] | Variation in Thickness Before/After Complete Adhesion [μm] |
|---|---|---|---|---|---|---|---|---|
| Comp. Ex. 1 | (75) *1 | 1.2 | A | B | 0 | 0 | —*2 | —*2 |

*1: Tack-free over clad layer
*2: Complete adhesion failed.

While the illustrative embodiments of the present invention are provided in the above description, such is for illustrative purpose only and it is not to be construed limitative. Modification and variation of the present invention that will be obvious to those skilled in the art is to be covered by the following claims.

What is claimed is:

1. A method of manufacturing an optical waveguide film comprising the steps of:
    forming a core layer; and
    forming a clad layer having an adhesive function and having a lower refractive index than that of the core layer by laminating a film of resin on a surface of the core layer,
    wherein when adhesively bonded to a silicon wafer with a lamination pressure of 400 kPa at a temperature of 130° C., the optical waveguide film has a resistance of 0.1 N/20 mm or more against peeling-off in a direction 90° relative to a surface of the silicon wafer at a peel rate of 50 mm/min.

2. A method of manufacturing an optical waveguide film comprising the steps of:
    forming a core layer; and
    forming a clad layer having an adhesive function and having a lower refractive index than that of the core layer by coating a liquid resin composition on a surface of the core layer, and then drying the resin composition thus coated,
    wherein when adhesively bonded to a silicon wafer with a lamination pressure of 400 kPa at a temperature of 130° C., the optical waveguide film has a resistance of 0.1 N/20 mm or more against peeling-off in a direction 90° relative to a surface of the silicon wafer at a peel rate of 50 mm/min.

3. A method of manufacturing an optical substrate comprising the steps of:
    forming a first positioning mark comprising a groove in a supporting substrate;
    forming a second positioning mark comprising a groove in an optical waveguide film, the second positioning mark corresponding to the first positioning mark, and the optical waveguide film comprising a clad layer having an adhesive function and a core layer covered by the clad layer;
    positioning the optical waveguide film to the supporting substrate by the first positioning mark and the second positioning mark, with a surface of the supporting substrate being in contact with a surface of the clad layer; and
    curing the clad layer of the positioned optical waveguide film by heating and pressurizing, so that the optical waveguide film is adhered to the supporting substrate,
    wherein when adhesively bonded to a silicon wafer with a lamination pressure of 400 kPa at a temperature of 130° C., the optical waveguide film has a resistance of 0.1 N/20 mm or more against peeling-off in a direction 90° relative to a surface of the silicon wafer at a peel rate of 50 mm/min.

4. A method of manufacturing an optical substrate comprising the steps of:
    positioning an optical waveguide film comprising a clad layer having an adhesive function and a core layer covered by the clad layer, to a supporting substrate so that optical axes between a light emitting element and a light receiving element pass through the core layer with a surface of the supporting substrate being in contact with a surface of the clad layer, and
    curing the clad layer of the positioned optical waveguide film by heating and pressurizing, so that the optical waveguide film is adhered to the supporting substrate,
    wherein when adhesively bonded to a silicon wafer with a lamination pressure of 400 kPa at a temperature of 130° C. the optical waveguide film has a resistance of 0.1 N/20 mm or more against peeling-off in a direction 90° relative to a surface of the silicon wafer at a peel rate of 50 mm/min.

* * * * *